United States Patent
Khalyapin

(10) Patent No.: US 11,683,363 B1
(45) Date of Patent: Jun. 20, 2023

(54) RE-DIRECTED FOLDER ACCESS ON REMOTE VOLUMES AND DRIVES

(71) Applicant: PARALLELS INTERNATIONAL GmbH, Schaffhaussen (CH)

(72) Inventor: Alexander Khalyapin, Tallinn (EE)

(73) Assignee: Parallels International GmbH, Schaffhausen (CH)

( * ) Notice: Subject to any disclaimer, the term of this patent is extended or adjusted under 35 U.S.C. 154(b) by 36 days.

(21) Appl. No.: 17/227,727

(22) Filed: Apr. 12, 2021

(51) Int. Cl.
*H04L 67/06* (2022.01)
*H04L 67/1097* (2022.01)
*G06F 9/4401* (2018.01)
*H04L 67/01* (2022.01)
*H04L 67/561* (2022.01)
*H04L 67/568* (2022.01)

(52) U.S. Cl.
CPC ............ *H04L 67/06* (2013.01); *G06F 9/4411* (2013.01); *H04L 67/01* (2022.05); *H04L 67/1097* (2013.01); *H04L 67/561* (2022.05); *H04L 67/568* (2022.05)

(58) Field of Classification Search
None
See application file for complete search history.

(56) References Cited

U.S. PATENT DOCUMENTS

| | | | |
|---|---|---|---|
| 10,142,435 B2 * | 11/2018 | Liao .................. | G06F 13/128 |
| 2015/0261633 A1 * | 9/2015 | Usgaonkar ......... | H04L 67/1097 714/6.3 |
| 2016/0124880 A1 * | 5/2016 | Goren ................. | G06F 3/067 710/263 |
| 2018/0205612 A1 * | 7/2018 | Rao .................... | G06F 8/60 |

FOREIGN PATENT DOCUMENTS

| | | | | |
|---|---|---|---|---|
| AU | 2008298533 A1 | * | 3/2010 | ........... G06F 3/0484 |
| AU | 2012200921 A1 | * | 3/2012 | ......... H04L 63/0272 |

OTHER PUBLICATIONS

Bai et al., "StoArranger: Enabling Efficient Usage of Cloud Storage Services on Mobile Devices", Jun. 1, 2017, 2017 IEEE 37th International Conference on Distributed Computing Systems (ICDCS) (pp. 1476-1487) (Year: 2017).*
Sehati et al., "WebPro: A proxy-based approach for low latency web browsing on mobile devices", Jun. 1, 2015, IEEE, 2015 IEEE 23rd International Symposium on Quality of Service (IWQoS) (pp. 319-328) (Year: 2015).*

* cited by examiner

*Primary Examiner* — Davoud A Zand
(74) *Attorney, Agent, or Firm* — Rosenberg, Klein & Lee

(57) ABSTRACT

When a user exploits virtualization software and navigates through or to a redirected client drive in a remote session then the file management application may refresh the directory/folder content very slowly, spending significantly more time than expected according to the amount of data, network speed and latency. Whilst this refreshing is being performed no actions with the file management application can be performed by the user. Accordingly to address this a system or method are provided that cache metainformation for files, folders, and subfolders, e.g. upon a network resource, in a driver which responds to a query directory and other related requests by filling a provided buffer with the cached data. Further, this driver may filter out some particular files from the results if a filtering option is selected to further reduce latency.

8 Claims, 7 Drawing Sheets

Figure 1

RE-DIRECTED FOLDER ACCESS ON REMOTE VOLUMES AND DRIVES

FIELD OF THE INVENTION

This patent application relates to file management and more particularly to reducing latency issues within file management applications accessing remote systems.

BACKGROUND OF THE INVENTION

File management applications, also known as file browsers, such as Microsoft™ Windows™ Explorer suffer a drawback or performance issue when browsing a network resources with significant latency. The result is that the file management application refreshes the folder content very slowly, spending significantly more time than expected according to amount of data, network speed and latency. Whilst this refreshing is being performed no actions with the file management application can be performed by the user.

With application virtualization software, such as Parallels™ Remote Application Server, a user can access Windows™ applications via individual devices from a shared server or cloud system. Accordingly, when a user exploiting such application virtualization software navigates through or to a redirected client drive in a remote session then the file management application issues arise and the user experiences the same drawbacks and performance issues outlined above.

Accordingly, it would be beneficial to provide users with a software solution to these performance issues.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to file management and more particularly to reducing latency issues within file management applications accessing remote systems.

In accordance with an embodiment of the invention there is provided a method comprising providing a client side helper application (client helper) in execution upon an electronic device associated with a user;

providing a server side driver application (driver) in execution upon a server in communication with the electronic device via a network;

providing a user mode proxy application (user mode proxy) in execution upon the server; and establishing a buffer storing metadata relating to a redirected drive folder path (path) relating to a folder accessible to an application in execution upon the electronic device; wherein the application in execution accesses the metadata stored within the buffer thereby reducing a latency of accessing data relating to the contents of the folder path.

In accordance with an embodiment of the invention there is provided a system comprising:

a client side helper application (client helper) comprising computer executable instructions stored within a memory which when executed by a processor of an electronic device associated with a user cause it to execute a portion of a process;

a server side driver application (driver) comprising further computer executable instructions stored within a further memory which when executed by a further processor of a server which is in communication with the electronic device via a network cause it to execute a further portion of a process;

a user mode proxy application (user mode proxy) comprising additional computer executable instructions stored within an additional memory which when executed by an additional processor of the server cause it to execute an additional portion of the process; wherein the process establishes a buffer storing metadata relating to a redirected drive folder path (path) relating to a folder accessible to an application in execution upon the electronic device; and the application in execution accesses the metadata stored within the buffer in order to reduce a latency of accessing data relating to the contents of the folder path upon the application the folder.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 depicts an exemplary electronic device and network supporting embodiments of the invention;

DETAILED DESCRIPTION

Figure 2:
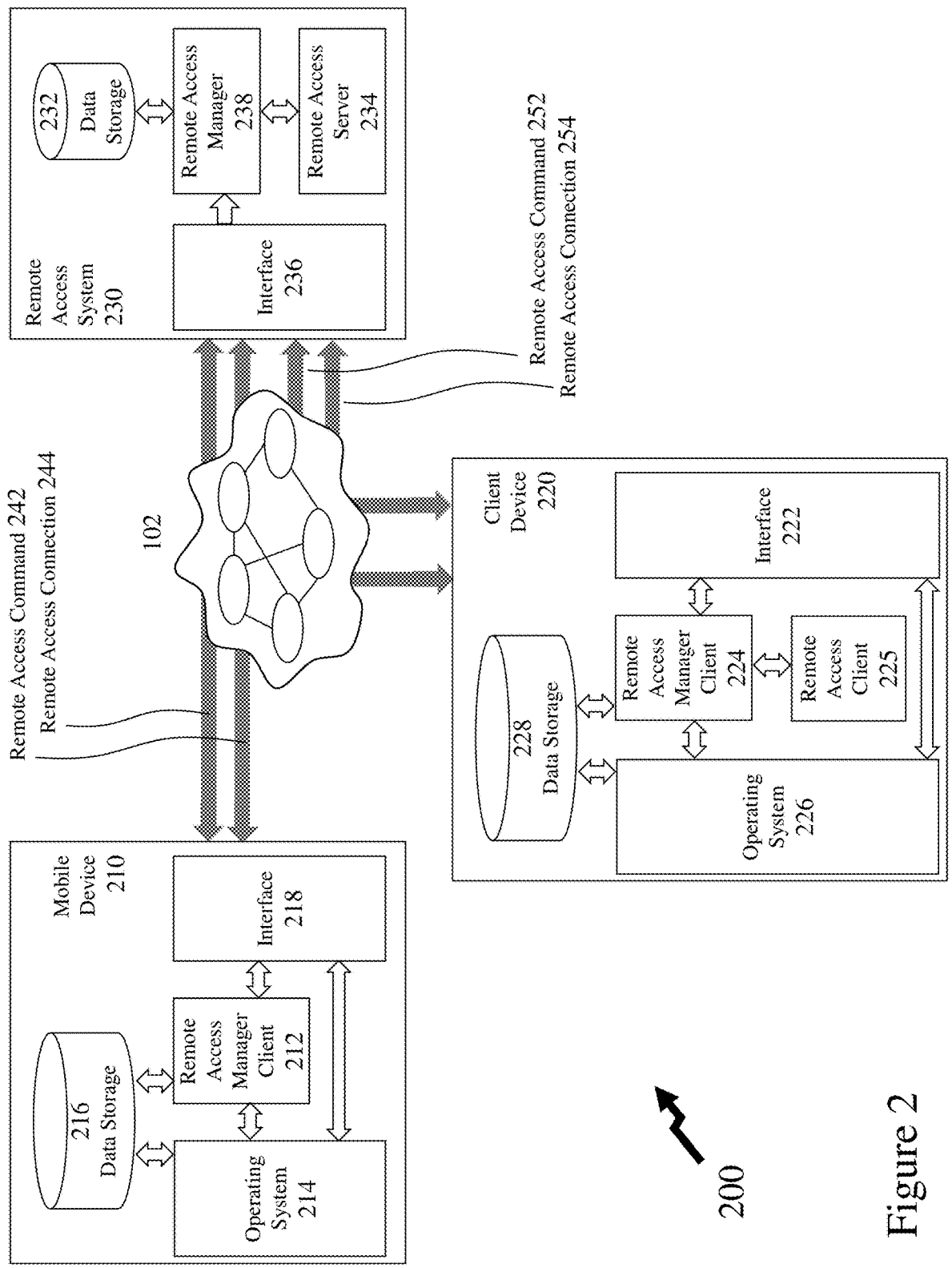
FIG. 2 depicts an exemplary block diagram of a system for initiating or transferring a remote access session between a mobile client and/or a client device and a remote access system supporting embodiments of the invention.

The present description is directed to file management and more particularly to reducing latency issues within file management applications accessing remote systems.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims.

Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers, or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "portable electronic device" (PED) as used herein may refer to, but is not limited to, a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device, and an electronic reader.

A "fixed electronic device" (FED) as used herein may refer to, but is not limited to, a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "wearable device" or "wearable sensor" (Wearable Device) as used herein may refer to, but is not limited to, an electronic device that is worn by a user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

A "client device" as used herein may refer to, but is not limited to, a PED, FED or Wearable Device upon which a user can access directly a file or files which are stored locally upon the PED, FED or Wearable Device, which are referred to as "local files", and/or a file or files which are stored remotely to the PED, FED or Wearable Device, which are referred to as "remote files", and accessed through one or more network connections or interfaces to a storage device.

A "server" as used herein may refer to, but is not limited to, one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

A "software application" (commonly referred to as an "application" or "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "graphical user interface" (GUI) as used herein may refer to, but is not limited to, a form of user interface for a PED, FED, Wearable Device, software application or operating system which allows a user to interact through graphical icons with or without an audio indicator for the selection of features, actions, etc. rather than a text-based user interface, a typed command label or text navigation.

An "enterprise" as used herein may refer to, but is not limited to, a provider of a service and/or a product to a user, customer, or consumer and may include, but is not limited to, a retailer, an online retailer, a market, an online marketplace, a manufacturer, a utility, a Government organization, a service provider, and a third party service provider.

A "service provider" as used herein may refer to, but is not limited to, a provider of a service and/or a product to an enterprise and/or individual and/or group of individuals and/or a device comprising a microprocessor.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of organizations, men, and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed, or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein may refer to, but is not limited to, a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein may refer to, but is not limited to, a computer resource for recording data discretely in a computer storage device, this data being electronic content. A file may be defined by one of different types of computer files, designed for different purposes. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is typically defined by its content since a file is solely a container for data, although, on some platforms the format is usually indicated by its filename extension, specifying the rules for how the bytes must be organized and interpreted meaningfully.

A "local file" as used herein may refer to, but is not limited to, a file, i.e. electronic content, which is stored directly upon a client device, e.g. a PED, FED, or Wearable Device, within a file system of a client device.

A "remote file" as used herein may refer to, but is not limited to, a file, i.e. electronic content, which is stored externally to a client's device and is accessible either through the file system of the client device or through exploitation of one or more protocols for providing a client device with shared file access to the file stored upon a remote storage device. Storing externally to a client's device may include, but not be limited to, storing one or more files on a removable memory storage device which can be connected to the client device, for example a Universal Serial Bus memory (commonly referred to as a memory stick) or an external drive (e.g. external hard disk drive (HDD)) coupled to a wired or wireless interface of the client device. A remote storage device may include, but not be limited to, a remote HDD accessible to the client device via a network, a cloud storage account or cloud storage server accessible via a network (e.g. the Internet, Local Area Network (LAN), etc.) a remote server accessible via a network (e.g. via Ethernet, Wi-Fi, etc.).

"Metadata" as used herein may refer to, but is not limited to, information stored as data that provides information about other data and may include, but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships, and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

A "wireless interface" as used herein may refer to, but is not limited to, an interface for a PED, FED, or Wearable Device which exploits electromagnetic signals transmitted through the air. Typically, a wireless interface may exploit microwave signals and/or RF signals, but it may also exploit visible optical signals, infrared optical signals, acoustic signals, optical signals, ultrasound signals, hypersound signals, etc.

A "wired interface" as used herein may refer to, but is not limited to, an interface for a PED, FED, or Wearable Device which exploits electrical signals transmitted through an electrical cable or cables. Typically, a wired interface involves a plug or socket on the electronic device which interfaces to a matching socket or plug on the electrical cable(s). An electrical cable may include, but not be limited, coaxial cable, an electrical mains cable, an electrical cable for serial communications, an electrical cable for parallel communications comprising multiple signal lines, etc.

A "geofence" as used herein may refer to, but is not limited to, a virtual perimeter for a real-world geographic area which can be statically defined or dynamically generated such as in a zone around a PED's location. A geofence may be a predefined set of boundaries which align with a real world boundary, e.g. state line, country etc., or generated boundary such as a school zone, neighborhood, etc. A geofence may be defined also by an electronic device's ability to access one or more other electronic devices, e.g. beacons, wireless antennas etc.

An "artificial intelligence system" (referred to hereafter as artificial intelligence, AI)" as used herein may refer to, but is not limited to, machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

"Machine Learning" (ML) or more specifically machine learning processes as used herein refers to, but is not limited, to programs, algorithms or software tools, which allow a given device or program to learn to adapt its functionality based on information processed by it or by other independent processes. These learning processes are in practice, gathered from the result of said process which produce data and or algorithms that lend themselves to prediction. This prediction process allows ML-capable devices to behave according to guidelines initially established within its own programming but evolved as a result of the ML. A machine learning algorithm or machining learning process as employed by an AI may include, but not be limited to, supervised learning, unsupervised learning, cluster analysis, reinforcement learning, feature learning, sparse dictionary learning, anomaly detection, association rule learning, inductive logic programming.

A "barcode" as used herein may refer to, but is not limited to, a method of representing data in a visual, machine-readable form. A barcode may represent data by varying the widths and spacings of parallel lines such as within linear or one-dimensional (1D) or using rectangles, dots, hexagons, and other geometric patterns, called matrix codes or two-dimensional (2D) barcodes. A barcode may comply with a standard or be application specific in order to represent the encoded alphanumeric data.

A "file manager" or "file browser" as used herein may refer to, but is not limited to, a computer program or application which provides a user interface to manage files and folders. Exemplary operations performed on files or groups of files may include, but not be limited to, creating, opening, viewing, playing, editing, printing, renaming, copying, moving, deleting and searching for files, as well as modifying file attributes, properties and file permissions. Within a file manager folders and/or files may be displayed in a hierarchical tree based upon their directory structure. A file manager may contain features analogous to web browsers, including forward and back navigational buttons, for example to redo or undo previously selected actions. A file manager can provide network connectivity via protocols, such as File Transfer Protocol (FTP), Hypertext Transfer Protocol (HTTP), Network File System (NFS), Server Message Block (SMB) or Web Distributed Authoring and Versioning (WebDAV) for example. Such functionality allowing the user to browse for a file server (i.e. by connecting and accessing the server's file system like a local file system) or by providing its own full client implementations for file server protocols.

Figure 1:
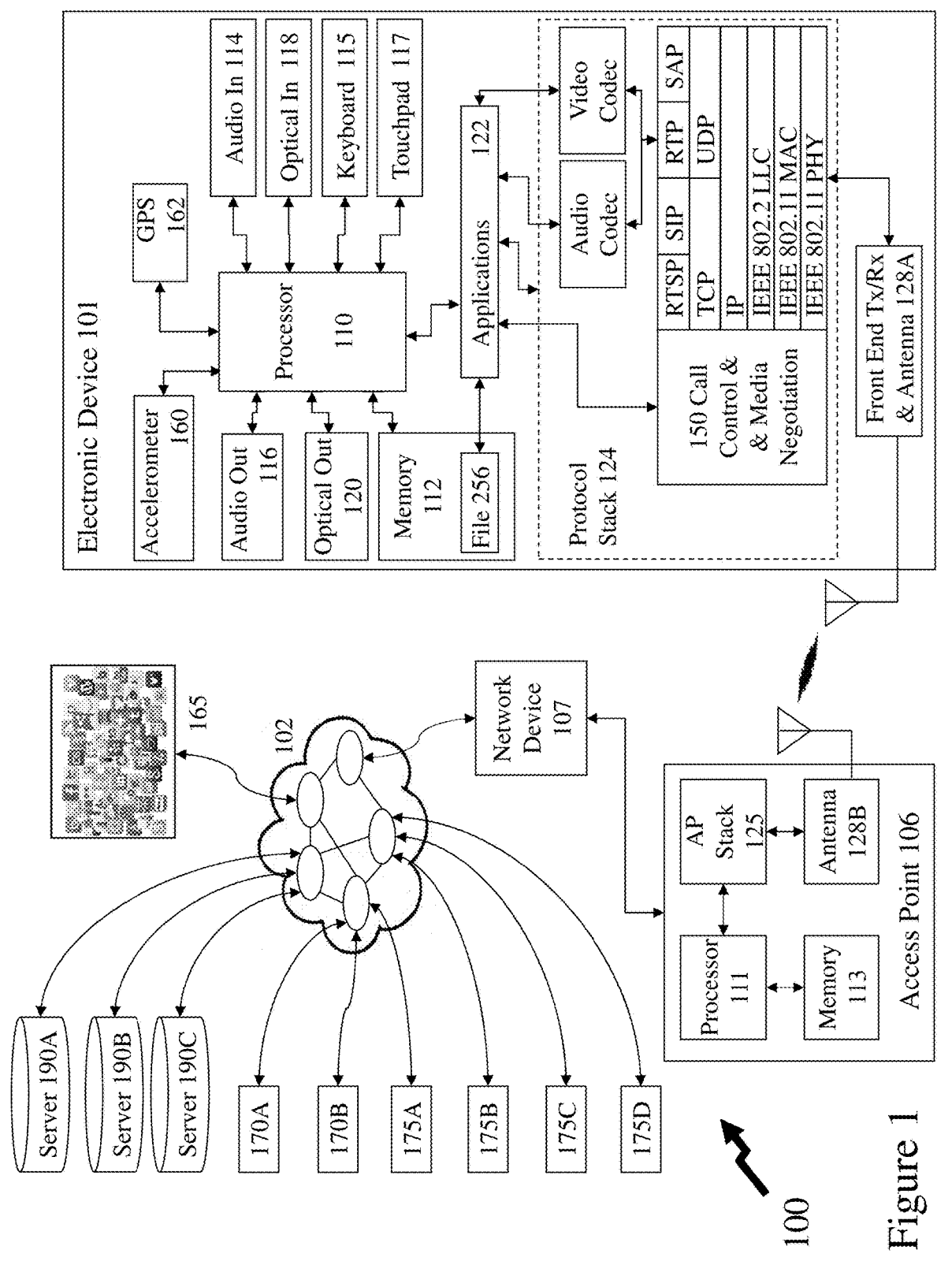

Now referring to FIG. 1 there is depicted a schematic 100 of a network to which an Electronic Device 101 supporting Remote Access System (RAS) Systems, Applications and Platforms (SAPs) and RAS-SAP features according to embodiments of the invention is connected. Electronic Device 101 may, for example, be a PED, a FED, or a wearable device and may include additional elements above and beyond those described and depicted. Also depicted in conjunction with the Electronic Device 101 are exemplary internal and/or external elements forming part of a simplified functional diagram of an Electronic Device 101 within an overall simplified schematic of a system supporting SAP features according to embodiments of the invention which include includes an Access Point (AP) 106, such as a Wi-Fi AP for example, a Network Device 107, such as a communication server, streaming media server, and a router. The Network Device 107 may be coupled to the AP 106 via any combination of networks, wired, wireless and/or optical communication links. Also connected to the Network 102 are Social Media Networks (SOCNETS) 165; first and second remote systems 170A and 170B respectively; first and second websites 175A and 175B respectively; first and third 3rd party service providers 175C and 175E respectively; and first to third servers 190A to 190C respectively.

The Electronic device 101 includes one or more Processors 110 and a Memory 112 coupled to Processor(s) 110. AP 106 also includes one or more Processors 111 and a Memory 113 coupled to Processor(s) 210. A non-exhaustive list of examples for any of Processors 110 and 111 includes a central processing unit (CPU), a digital signal processor (DSP), a reduced instruction set computer (RISC), a complex instruction set computer (CISC), a graphics processing unit (GPU) and the like. Furthermore, any of Processors 110 and 111 may be part of application specific integrated circuits (ASICs) or may be a part of application specific standard products (ASSPs). A non-exhaustive list of examples for Memories 112 and 113 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 101 may include an audio input element 214, for example a microphone, and an Audio Output Element 116, for example, a speaker, coupled to any of Processor(s) 110. Electronic Device 101 may include an Optical Input Element 218, for example, a video camera or camera, and an Optical Output Element 220, for example an LCD display, coupled to any of Processor(s) 110. Electronic Device 101 also includes a Keyboard 115 and Touchpad 117 which may for example be a physical keyboard and touchpad allowing the user to enter content or select functions within one of more Applications 122. Alternatively, the Keyboard 115 and Touchpad 117 may be predetermined regions of a touch sensitive element forming part of the display within the Electronic Device 101. The one or more Applications 122 that are typically stored in Memory 112 and are executable by any combination of Processor(s) 110. Electronic Device 101 also includes Accelerometer 160 providing three-dimensional motion input to the Processor(s) 110 and GPS 162 which provides geographical location information to Processor(s) 110. as described and depicted below in respect of FIGS. 2 and 3 respectively an Application 122 may support communications with a remote access system allowing one or more remote sessions to be established each associated with one or more Virtual Machines (VMs) allowing non-native applications (e.g. those requiring an Operating System (OS) different to that in execution upon the Processor 110) to be accessed and executed.

Electronic Device 101 includes a Protocol Stack 124 and AP 106 includes an AP Stack 125. Within Protocol Stack 124 is shown an IEEE 802.11 protocol stack but alternatively may exploit other protocol stacks such as an Internet Engineering Task Force (IETF) multimedia protocol stack for example or another protocol stack. Likewise, AP Stack 125 exploits a protocol stack but is not expanded for clarity. Elements of Protocol Stack 124 and AP Stack 125 may be implemented in any combination of software, firmware and/or hardware. Protocol Stack 124 includes an IEEE 802.11-compatible PHY module that is coupled to one or more Tx/Rx & Antenna Circuits 128A and an IEEE 802.11-compatible MAC module which is coupled to an IEEE 802.2-compatible LLC module. Protocol Stack 124 also includes modules for Network Layer IP, a transport layer User Datagram Protocol (UDP), a transport layer Transmission Control Protocol (TCP), a session layer Real Time Transport Protocol (RTP), a Session Announcement Protocol (SAP), a Session Initiation Protocol (SIP) and a Real Time Streaming Protocol (RTSP). Protocol Stack 124 includes a presentation layer Call Control and Media Negotiation module 150, one or more audio codecs and one or more video codecs. Applications 122 may be able to create maintain and/or terminate communication sessions with the Network Device 107 by way of AP 106 and therein via the Network 102 to one or more of Social Networks (SOCNETS) 165; first and second remote systems 170A and 170B respectively; first and second websites 175A and 175B respectively; first and third 3rd party service providers 175C and 175E respectively; and first to third servers 190A to 190C respectively. As described below in respect of FIGS. 2 and 3 a Remote Access System may be executed by and/or accessed by the Electronic Device 101 via the Network 102 on one or more of first and second websites 175A and 175B respectively; first and third 3rd party service providers 175C and 175E respectively; and first to third servers 190A to 190C respectively.

Typically, Applications 122 may activate any of the SAP, SIP, RTSP, and Call Control & Media Negotiation 150 modules for that purpose. Typically, information may propagate from the SAP, SIP, RTSP, Call Control & Media Negotiation 150 to the PHY module via the TCP module, IP module, LLC module and MAC module. It would be apparent to one skilled in the art that elements of the Electronic Device 101 may also be implemented within the AP 106 including but not limited to one or more elements of the Protocol Stack 124, including for example an IEEE 802.11-compatible PHY module, an IEEE 802.11-compatible MAC module, and an IEEE 802.2-compatible LLC module. The AP 106 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, and a call control & media negotiation module. Portable electronic devices (PEDs) and fixed electronic devices (FEDs) represented by Electronic Device 101 may include one or more additional wireless or wired interfaces in addition to or in replacement of the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1010, DSL, Dial-Up, DOCSIS, Ethernet, G.hn, ISDN, MoCA, PON, and Power line communication (PLC).

The Front End Tx/Rx & Antenna 128A wirelessly connects the Electronic Device 101 with the Antenna 128B on Access Point 206, wherein the Electronic Device 101 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. Accordingly, it would be evident to one skilled the art that the Electronic Device 101 may accordingly download original software and/or revisions for a variety of functions. In some embodiments of the invention the functions may not be implemented within the original as sold Electronic Device 101 and are only activated through a software/firmware revision and/or upgrade either discretely or in combination with a subscription or subscription upgrade for example. Accordingly, as will become evident in respect of the description below the Electronic Device 101 may provide a user with access to one or more RAS-SAPs including, but not limited to, software installed upon the Electronic Device 101 or software installed upon one or more remote systems such as those associated with Social Networks (SOCNETS) 165; first to fifth remote systems 170A to 170E respectively; first and second websites 175A and 175B respectively; and first to third 3rd party service provides 175C to 175E respectively; and first to third servers 190A to 190C respectively for example.

Accordingly, within the following description a remote system/server may form part or all of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Within the following description a local client device may be Electronic Device 101 such as a PED, FED or Wearable Device and may be associated with one or more of the Social Networks (SOCNETS) 165; first and second remote systems 170A and 170B respectively; first and second websites 175A and 175B respectively; first and third 3rd party service providers 175C and 175E respectively; and first to third servers 190A to 190C respectively. Similarly, a storage system/server within the following descriptions may form part of or be associated within Social Networks (SOCNETS) 165; first and second remote systems 170A and 170B respectively; first and second websites 175A and 175B respectively; first and third 3rd party service providers 175C and 175E respectively; and first to third servers 190A to 190C respectively.

Now referring to FIG. 2 there is depicted a schematic diagram 200 depicting an exemplary configuration for initiating a remote access session for connecting a Mobile Device 210 to a Remote Access System 206 and/or a Client Device 220. As depicted the Mobile Device 210 is in communication with the Remote Access System 230 over a Network 102, such as a local area network (LAN), wide area network (WAN), or the Internet. Further, the Client Device 220 is in communication with the Remote Access System 230 over the Network 102. Optionally, the remote sessions of the Mobile Device 210 and the Client Device 220 are independent sessions. Optionally, within the Remote Access System 230 may transfer a session to the Client Device 220 when the Mobile Device 210 is in proximity to the Client Device 220 where the transferred session is either configured upon an existing established session or is established by the Client Device 220 in dependence upon a communication or communications from the Remote Access System 230. Optionally, the Remote Access System 230 may transfer a session to the Mobile Device 210 from the Client Device 220 when the Mobile Device 210 is initially in proximity to the Client Device 220 and then is moved out of proximity whilst the remote session is still active, where the transferred session is either configured upon an existing established session or is established by the Mobile Device 210 in dependence upon a communication or communications from the Remote Access System 230. The Mobile Device 210 and Client Device 220 may be associated with a common user or with different users. Optionally, the Remote Access System 230 may also host and/or initiate a remote access session at a predetermined time.

The Remote Access System 230 may include one or more computing devices that perform the operations of the Remote Access System 230 and may, for example be a server such as first to third Servers 190A to 190C respectively individually or in combination. It would be evident that the Mobile Device 210 may be a PED, FED, or Wearable Device. Accordingly, with a session involving only the Mobile Device 210 and the Remote Access System 230 the session is established, maintained and terminated in dependence upon one or more Remote Access Commands 242 over a Remote Access Connection 244 between the Mobile Device 210 and the Remote Access System 230. Accordingly, with a session involving only the Client Device 220 and the Remote Access System 230 the session is established, maintained and terminated in dependence upon one or more Remote Access Commands 224 over a Remote Access Connection 254 between the Client Device 220 and the Remote Access System 230. When the session involves both the Mobile Device 210 and the Client Device 220 with the Remote Access Server then the session is established, maintained and terminated in dependence upon one or more Remote Access Commands 242 over a Remote Access Connection 244 between the Mobile Device 210 and the Remote Access System 230 and one or more Remote Access Commands 224 over a Remote Access Connection 254 between the Client Device 220 and the Remote Access System 230.

In each scenario one or more remote access sessions are established at the Remote Access System 230, either upon or in associated with a server such as first to third Servers 190A to 190C respectively in FIG. 1. The server, e.g. first Server 190A, may include one or more computing devices that perform the operations of the server. The server may be included in the Remote Access System 230 or another system that is separate and/or distinct from the Remote Access System 230 or the Remote Access System 230 may be in execution upon the server. A server application at the server initiates the one or more remote access sessions where initiating a remote access session may include, for example, executing boot-up and/or logon processes, such as running a script that automatically executes when the user logs in to the session, running applications from a folder designated as including applications to be automatically executed when the user logs in to the session, running services that automatically execute when the session starts and/or the user logs in to the session, and/or executing group policies or group policy preferences when the user logs in to the session. Alternatively, the remote access session may start the session and/or log in the user but only execute applications when these are triggered by one or more actions of the user upon the Mobile Device 210 and/or Client Device 220. In some implementations, the server application initiates the remote access session in response to determining that a remote access session has not already been initiated when a request from a device, e.g. Mobile Device 210 and/or Client Device 220, is received.

Figures 3A, 3B:
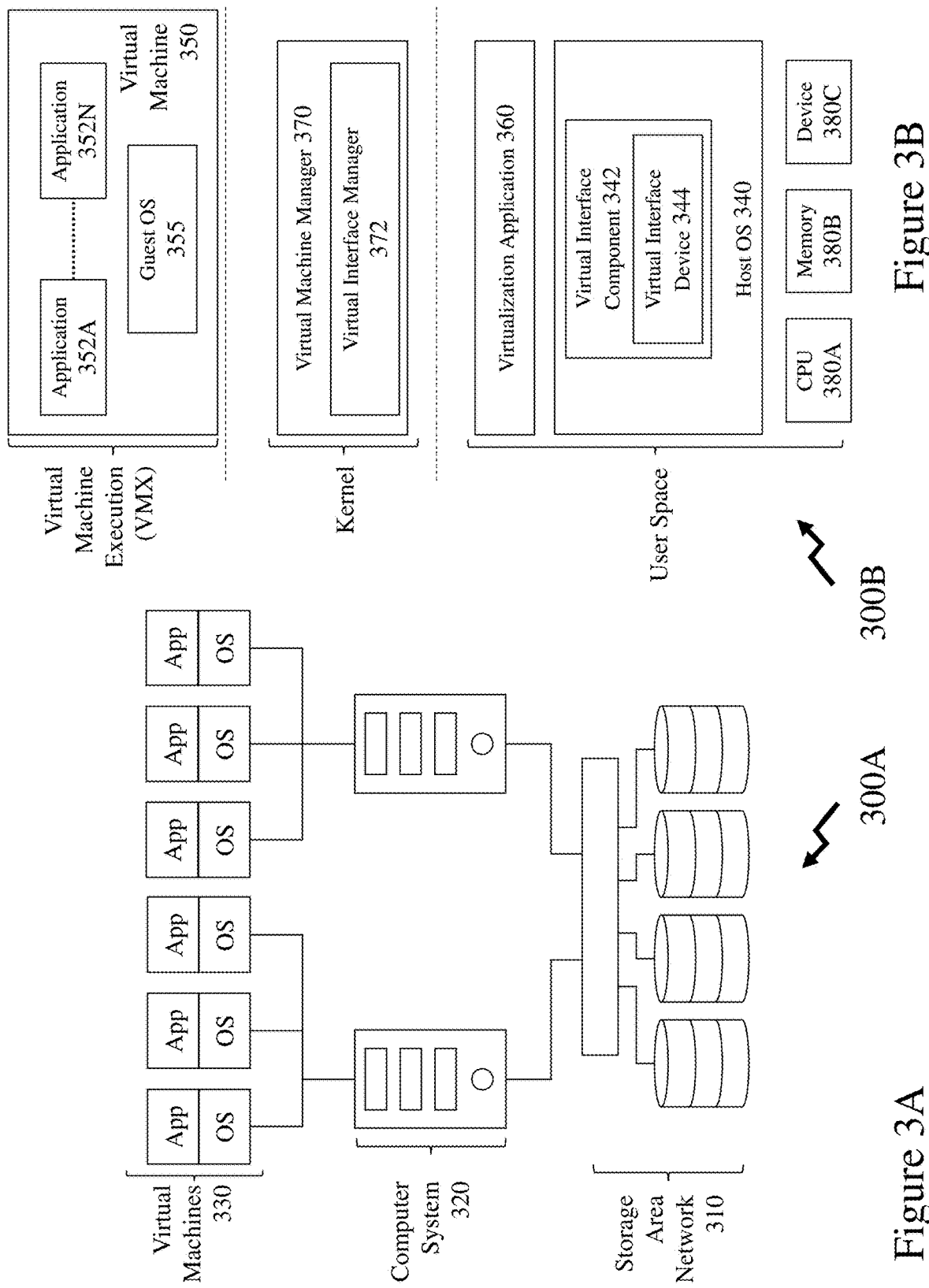
FIG. 3A depicts schematically an architecture of virtual machines as instantiated by remote access sessions supporting embodiments of the invention.
FIG. 3B depicts a high-level diagram of a computer system supporting exemplary virtual machine execution environments supporting one or more aspects and/or embodiments of the invention.

A remote access session may for example be an instance of a Virtual Machines 330 and 350 as described and depicted in FIGS. 3A and 3B respectively, is an instance of a user session or profile in execution upon the Remote Access System 230 which is accessed remotely at the Mobile Device 210 and/or Client Device 220 by a client application in execution upon the respective Mobile Device 210 and/or Client Device 220. The Mobile Device 210 and/or Client Device 220 connects to the Remote Access System 230 and initiates either a new remote access session or accesses an established remote access session either in execution or suspended pending user re-initiation. The remote access session allows the Mobile Device 210 and/or Client Device 220 to access resources of the Remote Access System 230 and therein those of the server(s) forming part of server or server system associated with the Remote Access System 230, such as volatile memory (e.g., random access memory), persistent memory (e.g., a hard drive), a processor (e.g., a central processing unit (CPU) or a graphics processing unit (GPU)), a component or components of an operating system, or an application or applications such as Applications 352A to 352N respectively as depicted in FIG. 3B. One or more of these resources may be physical resources that are accessed through the remote access session (e.g., through a terminal service) and are either directly accessible to the Remote Access System 230 or accessible to the Remote Access System 230 via the Network 102 or another network to which the Remote Access System 230 is also connected. For example, the Remote Access System 230 may be in execution upon a server which forms part of a server farm wherein the Remote Access System 230 can access resources upon or associated with the other servers in the server farm. One or more of these resources may be virtual resources that accessed through the remote access session (e.g., through remote desktop virtualization via a Virtual Machine).

Optionally, the Remote Access System 230 may cause the Mobile Device 210 and/or Client Device 220 to connect to the remote access session, such that a user of the Mobile Device 210 and/or Client Device 220 may then use the remote access session to access the resources and/or applications of the server. Optionally, the user of the Mobile Device 210 and/or Client Device 220 may trigger the connection to the Remote Access System 230 to establish the remote access session so that the user of the Mobile Device 210 and/or Client Device 220 may then use the remote access session to access the resources and/or applications of the server.

Within embodiments of the invention the Mobile Device 210 and/or Client Device 220 may communicate with the Network 102 through a wireless connection, such as a terrestrial wireless communication system (e.g., a cellular data network or one or more Wi-Fi networks) or a satellite system for example. Alternatively, the Mobile Device 210 and/or Client Device 220 may communicate with the Network 102 through a wired connection, such as Ethernet or Internet over cable for example. Alternatively, the Mobile Device 210 and/or Client Device 220 may communicate with the Network 102 through a wireless connection such as depicted in FIG. 1 to a network access point (e.g. Access Point 106) and therein to the Network 102 via Network Device 107 or through a network access point directly to the Network 102.

A remote access session may be possible only within a predetermined geofence, e.g. a Mobile Device 210 associated with user of an enterprise can only successfully establish a remote access session if the Mobile Device 210 is within one or more geofences where each geofence is associated with a location of the enterprise and/or a residence of the user, for example. Similarly, Client Device 206 may be similarly geofenced such that movement of the Client Device 206 inside a geofence allows a remote access session to be established and movement of the Client Device 206 outside of the geofence prevents a remote session being established and/or terminates an existing remote session. The application(s) accessible to the user within a remote access session are determined by whether the Mobile Device 210 and/or Client Device 220 used by the user is within a geofence. A user may define the geofences themselves, e.g. their residence or set it to some default inaccessible geofence (e.g. one of zero radius or the North Pole for example) such that upon loss of the Mobile Device 210 and/or Client Device 220 access to application(s) and/or remote access sessions is prevented. The Mobile Device 210 and/or Client Device 220 may determine their location by one or more means including, but not limited to, accessing a global positioning system (GPS, such as GPS receiver 162 as depicted in FIG. 1), by triangulation with or proximity to signals from one or more antennas with known locations, such as cellular data network towers in a cellular data network or Wi-Fi devices in the Wi-Fi networks. Optionally, the Mobile Device 210 and/or Client Device 220 may establish its location by communicating with another device in its proximity, e.g. a Mobile Device 210 without a GPS may establish a personal area network connection to another device, e.g. a smartphone of the user, and therein obtain its location.

As depicted in FIG. 2 the Mobile Device 210 includes one or more Interfaces 218 to communicate with the Network 102, such as wireless interfaces to a cellular data network, a Wi-Fi network, and/or a satellite system, for example, or a wired interface to an Internet Router, for example. The Mobile Device 210 includes a Remote Access Manager Client 212 that communicates with an Operating System 214 of the Mobile Device 210, for example, to determine a location of the Mobile Device 210 or access one or more applications. an application in execution upon the Mobile Device 210 may trigger the Remote Access Manager Client 212 to access the Remote Access System 230. The Remote Access Manager Client 212 and Operating System 214 can each access Data Storage 216.

Similarly, as depicted in FIG. 2 the Client Device 220 includes one or more Interfaces 222 to communicate with the Network 102, such as wireless interfaces to a cellular data network, a Wi-Fi network, and/or a satellite system, for example, or a wired interface to an Internet Router, for example. The Client Device 220 includes a Remote Access Manager Client 224 that communicates with an Operating System 226 of the Client Device 220, for example, to determine a location of the Client Device 220 or access one or more applications. an application in execution upon the Client Device 220 may trigger the Remote Access Manager Client 224 to access the Remote Access System 230. The Remote Access Manager Client 224 and Operating System 226 can each access Data Storage 216 whilst the Remote Access Manager Client 224 may also access or communicate with Remote Access Client 225.

Similarly, as depicted in FIG. 2 the Remote Access System 230 includes one or more Interfaces 236 to communicate with the Network 102 and a Remote Access Manager 238 which communicates with Data Storage 232 that stores information that identifies or relates to a remote access session associated with the Mobile Device 210 and/or Client Device 220. As depicted the Remote Access Manager 238 communicates via Remote Access Commands 242 over Remote Access Connection 244 between its Interface 236 and Interface 236 of the Mobile Device 210. Similarly, the Remote Access Manager 238 communicates via Remote Access Commands 224 over Remote Access Connection 254 between its Interface 236 and Interface 222 of the Client Device 220. Accordingly, the Mobile Device 210 and/or Client Device 220 can send a remote access command to the Remote Access System 230 to initiate and/or connect to a remote access session or the Remote Access System can send a remote access command to Mobile Device 210 and/or Client Device 220 to initiate and/or connect to a remote access session.

As depicted in FIG. 2 the Remote Access System 230 in addition to the Remote Access Manager 238 and Data Storage 232 includes a Remote Access Server 234 which is hosted at a server that may include one or more computing devices. The server may be included in the Remote Access System 230 or be a system that is separate and/or distinct from the Remote Access System 230. The Remote Access Manager 238 may cause the Remote Access Server 234 to initiate a remote access session. Once connected, a user of the Mobile Device 210 may access resources provided by the server through the Remote Access Connection 244 to the remote access session or a user of the Client Device 220 may access resources provided by the server through the Remote Access Connection 254 to the remote access session.

Within some implementations, the Remote Access Manager Client 212 at the Mobile Device 210 and/or the Remote Access Manager Client 224 at the Client Device 220 receive an input from a user, device, and/or application that includes authentication information, such as a username, password, and/or one-time password. The Remote Access Manager Client 212 and/or the Remote Access Manager Client 224 may provide the authentication information to the Remote Access Manager 238. The Remote Access Manager 238 may condition the sending of the Remote Access Command 242 on having successfully verified authentication information received from the Mobile Device 210 or Remote Access Command 252 on having successfully verified authentication information received from the Client Device 220. This verification, being for example, against corresponding authentication information that is stored at the Remote Access System 230 in the Data Storage 232 or another memory accessible to the Remote Access System 230 (e.g., a username and/or password) and/or calculated by the Remote Access Manager 238 (e.g., a one-time password). In some implementations, the authentication information may include information from a scanner/device, such as biometric data from a biometric scanner and/or biometric device (e.g. a fingerprint, facial scanner, or credential data of the user from a card scanner and/or reader device (e.g. as employed for access control), associated with the Mobile Device 210 and/or Client Device 220 or a location such as a worksite, office, enterprise access point etc. The information provided to the Remote Access System 230 by the Mobile Device 210 and/or Client Device 220 retrieved from the scanner/device may also include information that identifies a user account associated with the successful verification of the user or is retrieved from another system in dependence upon the information retrieved from the scanner/device. This information may be provided as obtained or as processed by a system such as the user's electronic device, e.g. Mobile Device 210 or Client Device 220. This information provided to the Remote Access System 230 may also include information that identifies the scanner/device as well as time and/or date of the information being acquired and/or geographic location information of the scanner/device location. Such a verification providing an alternate means of restricting remote access sessions and/or application executable within a remote access session to geofencing.

In response to successfully verifying the received authentication information, the Remote Access Manager 238 may perform a transformation on the received authentication information and/or additional information, such as by creating a hash of the information, to generate a key. The Remote Access Manager 238 may provide the key to the Remote Access Manager Client 212 at the Mobile Device 210 and/or the Remote Access Manager Client 224 at the Client Device 220. The Remote Access Manager Client 212 may store the key in a Data Storage 216 at the Mobile Device 210. The Remote Access Manager Client 224 may store the key in a Data Storage 228 at the Client Device 220. Alternatively, the Remote Access Manager Client 212 and/or the Remote Access Manager Client 224 may perform a transformation on the authentication information and/or additional information to generate the key and store the key in the Data Storage 216 and/or the Data Storage 228, respectively. The Remote Access Manager Client 212 may provide the key and/or a reverse of the transformation of the key to the Remote Access System 230 for authentication of the Mobile Device 210 by the Remote Access System 230. The Remote Access Manager Client 224 may provide the key and/or a reverse of the transformation of the key to the Remote Access System 230 with subsequent checks for remote access commands for authentication of the Client Device 220 by the Remote Access System 230. The communications between the Mobile Device 210, the Remote Access System 230, and/or the Client Device 220 over the Network 102 may be encrypted.

The authentication information used for authenticating the Remote Access Manager Client 224 at the Client Device 220 with the Remote Access Manager 238 at the Remote Access System 230 may be the same authentication information that is used to authenticate the Remote Access Client 225 with the Remote Access Server 234 or alternatively it may be separate and/or distinct.

In response to the Remote Access Manager Client 224 receiving the Remote Access Command 254, the Remote Access Manager Client 224 may instruct the Remote Access Client 225 to connect to the remote access session provided by the Remote Access Server 234 in the background of a user profile for the Client Device 220. Optionally, a user interface of the Client Device 220 may be locked requiring the user to provide authentication information to the Client Device 220 to unlock the user interface for the user profile where the Remote Access Client 225 establishes the Remote Access Connection 244 to the remote access session. Similarly, Remote Access Manager Client 212 receiving the Remote Access Command 242, the Remote Access Manager Client 212 may connect to the remote access session provided by the Remote Access Server 234 in the background of a user profile for the Mobile Device 210. Optionally, a user interface of the Mobile Device 210 may be locked requiring the user to provide authentication information to the Mobile Device 210 to unlock the user interface for the user profile where the Remote Access Manager Client 212 establishes the Remote Access Connection 254 to the remote access session.

The Remote Access Manager 238 may send a command to the Remote Access Server 234 to disconnect from a remote access session, for example, once the Remote Access Manager 238 has verified that the Remote Access Server 234 has completed a remote access session or upon receiving a Remote Access Command 242 from Mobile Device 210 or Remote Access Command 254 from Client Device 220 to terminate a remote access session. the Remote Access Manager 238 and/or Remote Access Server 234 may receive a Remote Access Command 242 from Mobile Device 210 or Remote Access Command 254 from Client Device 220 to log-off a remote access session such that the associated Remote Access Connection 244 or 232 is terminated but the processing upon the Remote Access System 230 and/or Remote Access Server 234 is not terminated. Accordingly, a remote access session may be initiated to establish a process, e.g. a numerical simulation within a computer aided design application, where the connection is not required to be maintained until the user wishes to access the results of the process. Similarly, the Remote Access Manager 238 and/or Remote Access Server 234 may receive a Remote Access Command 242 from Mobile Device 210 or Remote Access Command 254 from Client Device 220 to suspend a remote access session such that the associated Remote Access Connection 244 or 232 is terminated and the processing upon the Remote Access System 230 and/or Remote Access Server 234 suspended pending subsequent re-initiation of the remote access session.

Referring to FIG. 3A there is depicted a schematic architecture 300A supporting embodiments of the invention. As depicted a plurality of virtual machines (VMs) 130 are associated with a plurality of Computer Systems 320 which are themselves associated with a storage area network (SAN) 310. The plurality of Computer Systems 320 may be directly connected or indirectly connected via one or more communications networks to the 310, such as Network 102 in FIGS. 1 and 2. Accordingly, each VM 130 may employ virtual memory pages which are mapped to physical memory pages upon the 310. A Computer System 320 may be connected to one or more SANs 110. Whilst the descriptions in respect of FIGS. 3A to 3B are described with respect to a Computer System 320 hosting one or more VMs 330 it would be evident that these may be supported by a PED, a FED, a WED, a server or a WES directly or indirectly through communications within one of the plurality of Computer Systems 320. A computer system 320 may itself be a PED, a FED, a WED, a server, or a WES. Accordingly, a computer system 320 may, as depicted in FIG. 3B, support a virtual machine execution (VMX) environment as a host system directly or indirectly or it may include a virtual machine monitor (VMM) facilitating execution of one or more VMs, each of which may, as depicted in FIG. 3B, run a guest operating system (OS) 355 to manage one or more Guest Applications 352A to 352N respectively. Accordingly, a Computer System 320 may be a Remote Access System 230 and SAN 310 may be Data Storage 232 as depicted in FIG. 2. In this manner, a remote session established by a user may support one or more VMs 330 and therein a guess OS 355 and one or more Guest Applications 352A to 352N as depicted in FIG. 3B.

FIG. 3B depicts a high-level diagram of a computer system (host system) 300B supporting exemplary VMX environments supporting one or more aspects and/or embodiments of the present disclosure. The Host System 300B, e.g. Computer System 320 in FIG. 3A or Remote Access System 230 in FIG. 2, may include one or more central processing units (CPU) 380A communicatively coupled to one or more memory devices 380B and one or more peripheral devices 380C via a system bus, not depicted for clarity. The Host System 300B may implement a virtual execution environment for executing the software developed for a platform that is different from the native platform of the Host System 300B. In certain implementations, the virtual execution environment may be implemented using certain hardware-assisted virtualization features of the CPU 180A, which may support executing, at an elevated privilege level one or more elements, including but not limited to, a VMM 370 that manages one or more VMs. In various implementations, the VMM 370 may be implemented as a kernel module, a kernel extension, a driver, or a part of the Host Operating System (OS) 340. The Host OS 340 may further include a virtual interface component 142 which virtualizes a virtual interface component 142 to manage one or more Virtual Interface Devices 344 for use by the VM 350 and/or Host OS 340.

The VMM 370 may present a VM 350 with an abstraction of one or more virtual processors, while retaining selective control of processor resources, physical memory, interrupt management, and input/output (I/O). The VMM 370 may also present a VM 350 with an abstraction of one or more Virtual Interface Devices 344 of the Virtual Interface Component 342. A VM 350 may implement a software environment which may be represented by a stack including a Guest OS 355 and one or more applications 155A-155N. Each VM 350 may operate independently of other VMs and use the VMM-facilitated interface to the processors, memory, storage, graphics, and I/O provided by the Host System 300B. The VMM 370 may include a Virtual Interface Manager 372 to receive instructions to create a communication channel between a Host OS 340 and a Guest OS 355. The Virtual Interface Manager 372 may also send a request to Host OS 340 to create a Virtual Interface Device 344 and provide the Virtual Interface Device 144 to Guest OS 355. In considering VMX operation then there are two kinds of VMX operation commonly referred to, namely VMX root operation and VMX non-root operation. In general, a VMM, such as VMM 370 in FIG. 3B, will run in VMX root operation and guest software, such as Guest OS 355 and Applications 352A to 352N will run in VMX non-root operation. Transitions between VMX root operation and VMX non-root operation are called VMX transitions. There are two kinds of VMX transitions, those into VMX non-root operation from VMX operation are called VM entries whilst those from VMX non-root operation to VMX root operation are called VM exits.

Accordingly, a user may, for example, remotely access from either their PED, e.g. Mobile Device 210 in FIG. 2, and/or FED, e.g. Client Device 220 in FIG. 2, applications upon a remote system, e.g. Remote Access System 230 in FIG. 2, wherein a remote session they establish instantiates one or more instances of a Virtual Machine, such as Virtual Machine (VM) 350 in FIG. 3, to execute the application(s) the user wishes to execute. By virtue of exploiting VMs 350 then the operating system for these applications may be different from or the same as that of the operating system of the user's electronic device. Accordingly, the VM 350 operating system, Guest OS 355, for each VM 350 instantiated may be established as one of Linux, Windows, Android, and iOS, for example, which may be the same as or different to the operating system of the user's device, e.g. Mobile Device 210 or Client Device 220.

File management applications, also known as file browsers, such as Microsoft™ Windows™ Explorer suffer a drawback or performance issue when browsing a network resources with significant latency. The result is that the file management application refreshes the folder content very slowly, spending significantly more time than expected according to amount of data, network speed and latency. Whilst this refreshing is being performed no actions with the file management application can be performed by the user.

With application virtualization software, such as Parallels™ Remote Application Server, a user can access Windows™ applications via individual devices from a shared server or cloud system. Accordingly, when a user exploiting such application virtualization software navigates through or to a redirected client drive in a remote session then the file management application issues arise and the user experiences the same drawbacks and performance issues outlined above.

Figure 4:
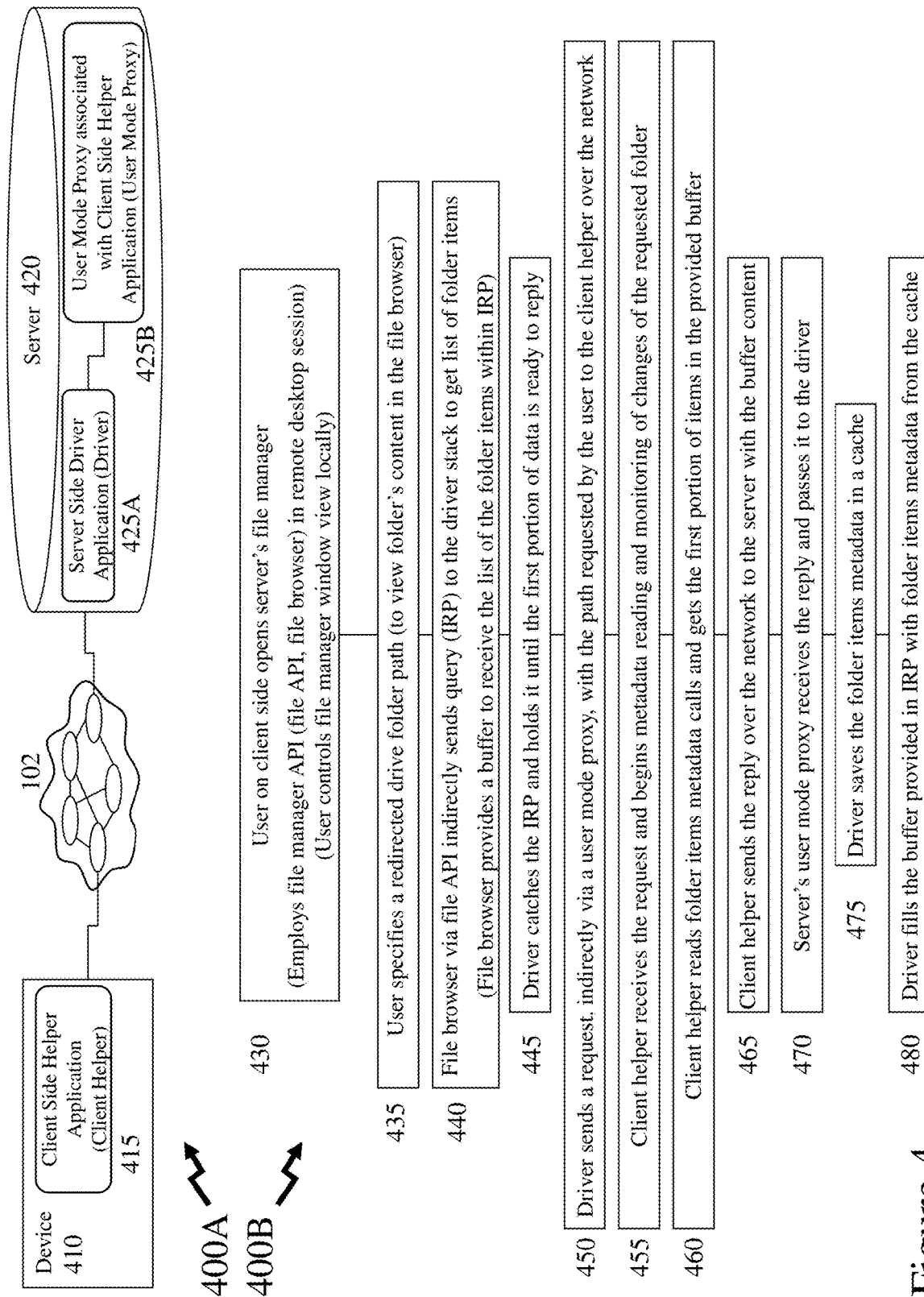
FIG. 4 depicts an exemplary configuration and process flow according to an embodiment of the invention.
Figure 5:
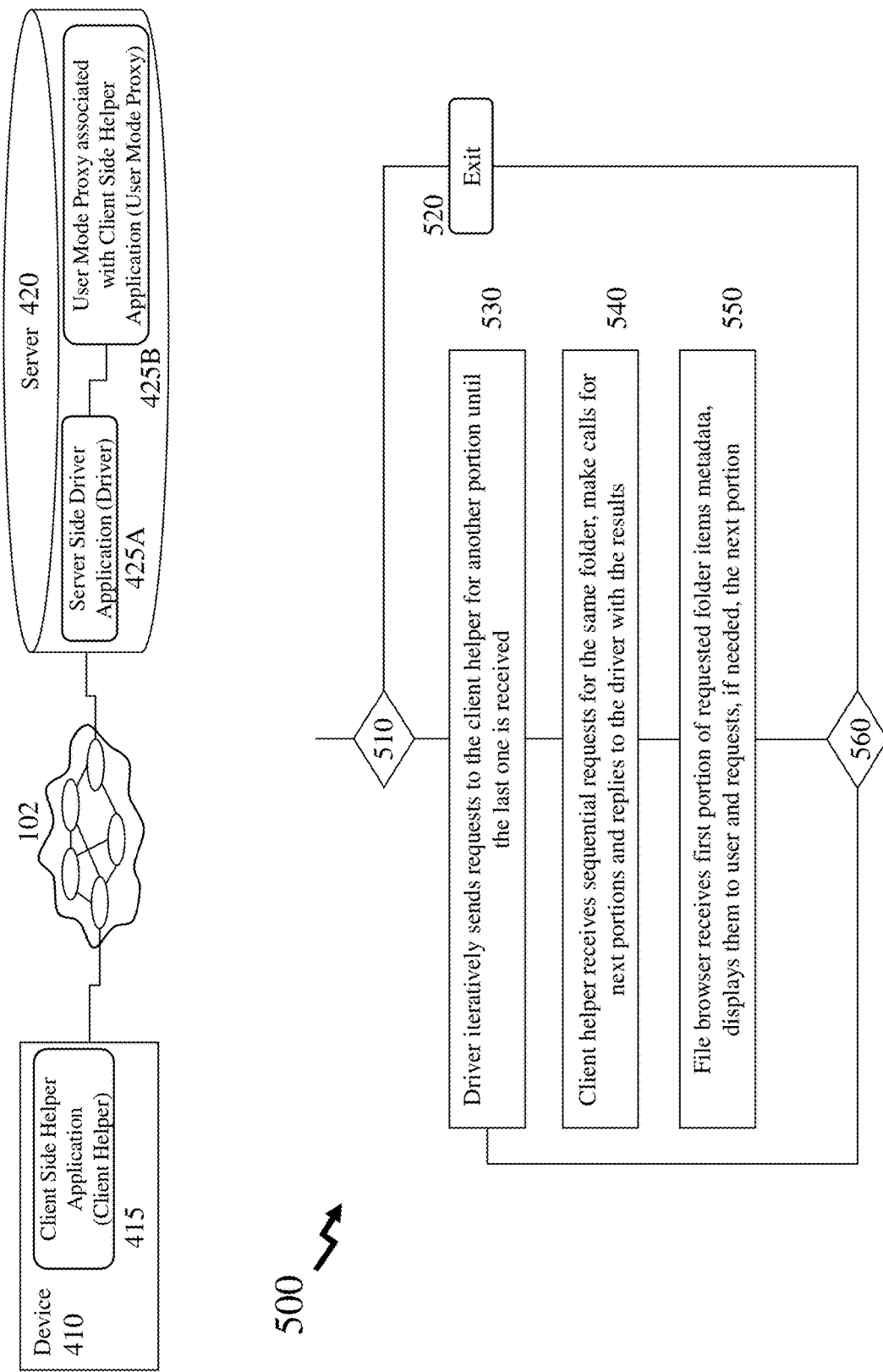
FIG. 5 an exemplary process flow according to an embodiment of the invention.
Figure 6:
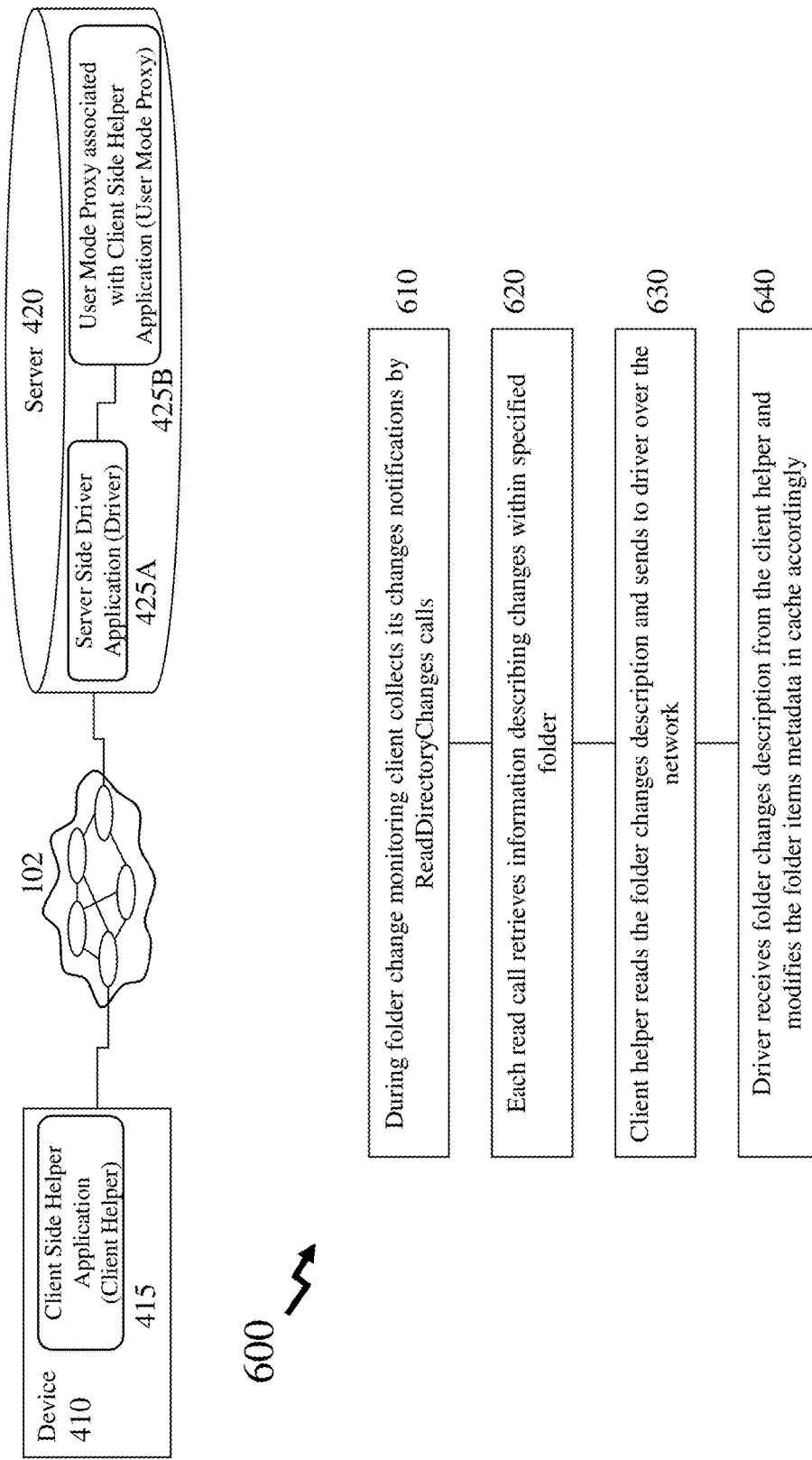
FIG. 6 depicts an exemplary process flow according to an embodiment of the invention.

Whilst the descriptions below with respect to embodiments of the invention and FIGS. 4 to 6 are primarily directed to file management applications executing in conjunction with application virtualization with files/directories upon a remote server it would be evident that these embodiments may be applied to local drives to address the latency issues when the number of directories and/or number of files becomes significant. Further, whilst embodiments of the invention are described and depicted with respect to Windows™ it would be evident that the embodiments of the invention may be exploited with other file management applications as well as dialogues within software applications that retrieve and render directory/folder/file information to a user. For example, this may be through an Open File dialog in an application such as Notepad for example.

Accordingly, it would be beneficial to provide users with a software solution to these performance issues. Embodiments of the invention address the issue by caching metainformation for files, folders, and subfolders, e.g. upon a network resource, in a driver which responds to a query directory and other related requests by filling a provided buffer with the cached data. Further, this driver may filter out some particular files, such desktop.ini for example, from the results if a filtering option is selected.

When Microsoft™ Windows™ Explorer, other file management applications, or file management commands, such as command line utility dir, shows a list of files for a folder from a drive with significant latency, such as one redirected over a network, they request the content directly or indirectly by iteratively calling an application programming interface (API) function, e.g. the Windows™ API function NtQueryDirectoryFile, which sends a special packet, e.g. IRP_MJ_DIRECTORY_CONTROL/IRP_MN_QUERY_DIRECTORY, into the file system driver stack. Each time the caller provides a buffer to get the next part of the requested content.

However, within Windows™ implementations for a redirected drive this puts data into the buffer only for one file per call, regardless of the fact that the API enables passing multiple files data per NtQueryDirectoryFile call. Accordingly, that requested file metainformation is then transferred over the network from the peer during the I/O Request Packets (IRP) IRP processing such that when there are N items in a folder to be displayed this causes at least N separate network communication cycles between the driver and the network peer. This can be slow even with low latency where the number N is large but can become significantly worse when network latency increases and/or number N increases where the network communication cycles are from a local device or client device to a remote server, remote storage etc.

Another problem is when the file management application reveals specific files, e.g. Windows™ Explorer reveals the desktop.ini file, in a browsed folder or its subfolders then it reads that file content multiple time and tries to open and read some other files on the redirected drive according to data from that specific file, e.g. desktop.ini. This causes additional network traffic and therefore a significant delay just to show the folder content a customized way. However, in general, a user does not wish to wait for the browser view is ready and prefers getting a non-customized result faster allowing them to find the required files, directory, subdirectory etc. and perform the action(s) they wish to perform. Accordingly, embodiments of the invention allow such specific files to be filtered thereby avoiding such degradations in performance.

Now referring to FIG. 4 there is depicted an exemplary configuration 400A according to an embodiment of the invention. As depicted there are:
Device 410, such as a Local Device 210 or Client Device 220 as depicted in FIG. 2;
Client Side Helper Application (Client Helper) 415 executing upon the Device 410;
Server 420 connected to Device 410 via Network 102;
Server side driver application (Driver) 425A executing upon the Server 420; and
User Mode Proxy 425B associated with the Client Side Helper Application 415.

Flow 400B in FIG. 4A depicts an exemplary process flow according to an embodiment of the invention. As depicted this comprises first to eleventh steps 430 to 480 respectively, these comprising:

First step 430 wherein a user from a client side, e.g. upon Device 410, opens a server's file management application (FMApp), for example Windows™ Explorer or another application, which uses file manager API (file browser), in the remote desktop session allowing the user to see and control the application window view locally.

Second step 435 wherein the user specifies a redirected drive folder path to "watch" the folder's content in the browser.

Third step 440 wherein the browser via the file management API (FMAPI), e.g. Windows™ file API, indirectly sends an IRP, e.g. IRP_MN_QUERY_DIRECTORY, to the driver stack to get the list of the folder items and provides a buffer to receive it.

Fourth step 445 wherein the Driver 425A catches the IRP and holds it until a first portion of data is ready to reply with.

Fifth step 450 where the Driver 425A sends a request, e.g. indirectly via a user mode proxy, with the path requested by the user to the Client Helper 415 over the network.

Sixth step 455 wherein the Client Helper 415 receives the request and begins a process of metadata reading and monitoring of changes of the requested folder.

Seventh step 460 wherein the Client Helper 415 reads folder items metadata calls NtQueryDirectoryFile and obtains the first items portion in the provided buffer. This being as many first items as can fit with the buffer. Accordingly, adjusting the size of this buffer may adjust the overall file access latency. Optionally, this buffer size may be dynamically adjusted by the systems according to embodiments of the invention in dependence upon measured performance of the process according to the available memory. Optionally, the systems may store latency information of servers allowing the buffer size to be determined in dependency upon this latency performance.

Eighth step 465 wherein the Client Helper 415 sends the reply over the network to the server with the buffer content.

Ninth step 470 wherein the User Mode Proxy 425B receives the reply and passes it to the Driver 425A.

Tenth step 475 wherein the Driver 425A saves the folder items metadata in a cache.

Eleventh step 480 wherein the Driver 425A fills the buffer, provided in response to the IRP, e.g. IRP_MN_QUERY_DIRECTORY, with the folder items metadata from the cache. This buffer filling being as much folder items metadata that the buffer can accept. Optionally, this may exclude specific files, either specified by defaults of the Client Helper 415 or the user in the Client Helper 415. Once the folder items metadata has been stored then the Driver 425A completes the IRP.

It would be evident that in instances the cache will not contain all the folder items metadata due to either the size of the specified buffer or the number of folder items for which the metadata is being stored. Accordingly, referring to FIG. 5 there is depicted a Sub-Flow 500 which may be executed as part of the Flow 400B to address this issue. As depicted Sub-Flow 500 comprising first to sixth steps 510 to 560 respectively, these comprising:

First step 510 wherein a determination is made as to whether all the folder items metadata has been retrieved or not, wherein if it has then Sub-Flow 500 proceeds to second step 520 and exits otherwise it proceeds to third step 530.

Third step 530 wherein the Driver 425A iteratively sends requests to the Client Helper 415 for another portion until the last one is received as determined in sixth step 560.

Fourth step 540 wherein the Client Helper 415 receives sequential the requests for the same folder from the Driver 425A, makes additional calls, e.g. additional NtQueryDirectoryFile, to obtain the next portion and replies to the Driver 425A with the result.

Fifth step 550 wherein the file browser receives the portion of requested folder items metadata, displays them to the user and requests, if needed, the next portion.

Sixth step 560 wherein if another request is required for another portion the Sub-Flow 500 iterates to third step 510 otherwise it proceeds to second step 520 and exits.

It would be evident that these file browser-driver and driver-helper communications flows may be performed in a single thread or in multiple threads with synchronization provided by the Driver 425A.

Now referring to FIG. 6 there is depicted a Flow 600 according to an embodiment of the invention relating to folder monitoring within embodiments of the invention. Flow 600 comprising first to fourth steps 610 to 640 respectively, these comprising:

First step 610 wherein during the folder changes monitoring the client collects changes notifications by calling an appropriate call, e.g. ReadDirectoryChanges.

Second step 620 wherein each call, e.g. ReadDirectoryChanges, retrieves information that describes the changes within the specified folder.

Third step 630 wherein the Client Helper 415 reads these changes description and sends it to the Driver 425A over the network.

Fourth step 640 wherein the Driver 425A receives folder changes description from the Client Helper 415 and modifies the folder items metadata in the cache accordingly.

Accordingly, a file management application according to an embodiment of the invention may execute a process of monitoring with a process comprising the steps of:
  employing an application programming interface (API) to subscribe to notifications relating to a folder associated with the monitored path, where the notifications relate to changes in the folder;
  upon receiving a notification relating to the folder retrieving, with the API, information describing changes within the folder;
  establishing in dependence upon the retrieved information a folder change description;
  sending, with the client helper, the folder change description to the driver over the network;
  receiving, with the driver, the folder change descriptions; and
  modifying, with the driver, the folder items metadata in cache according to the received folder change descriptions.

Within an embodiment of the invention this monitoring process with respect to Microsoft™ Windows™ may accordingly exploit the Windows™ API such that upon receipt of a notification the retrieval of information describing changes within the folder is performed by calling Windows™ API ReadDirectoryChanges.

Figure 7:
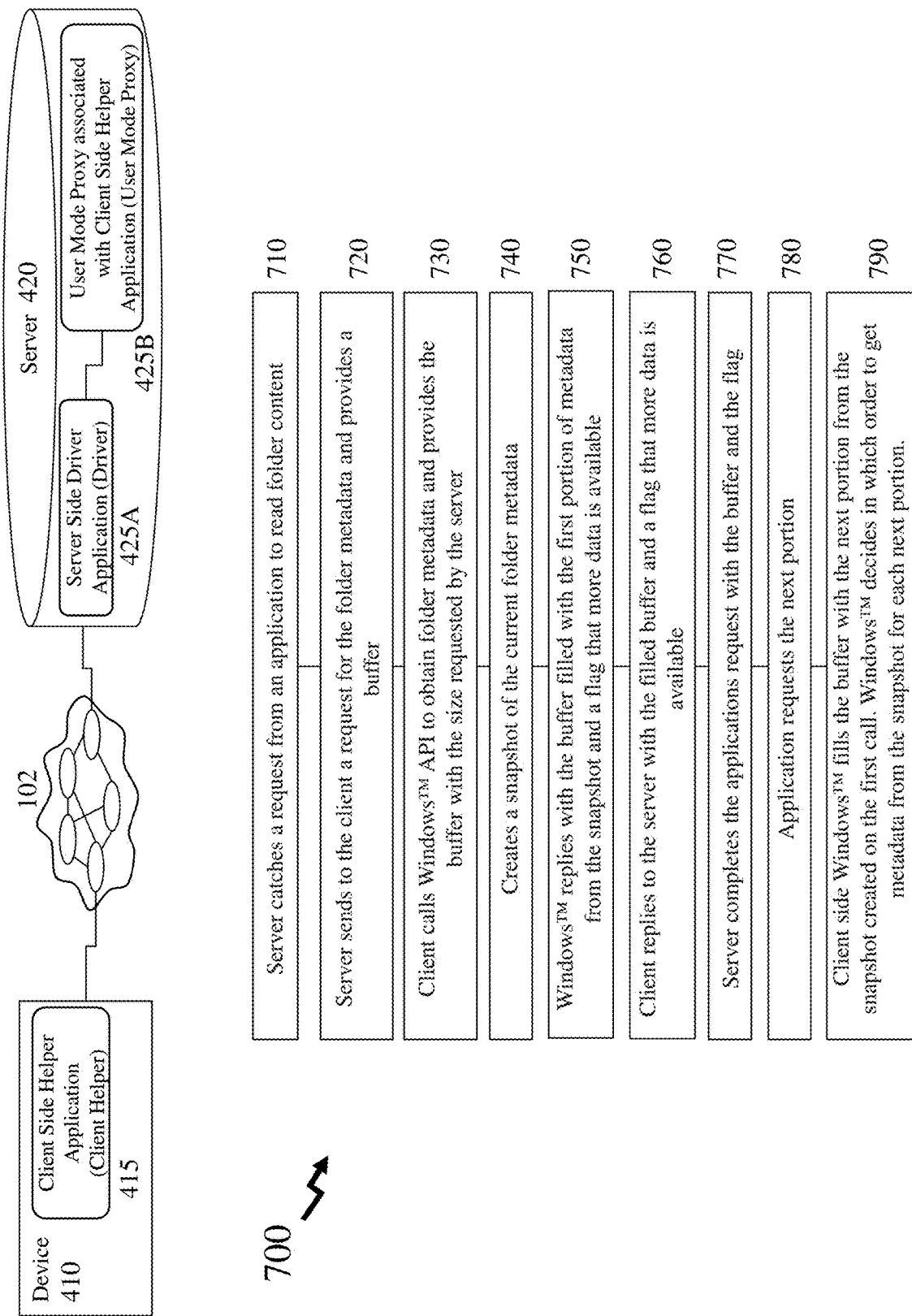
FIG. 7 depicts an exemplary process flow according to an embodiment of the invention.

Now referring to FIG. 7 there is depicted a process Flow 700 relating to the condition where the buffer provided is not large enough thereby triggering multiple reads for multiple portions of content where each portion of the content is that received on the client side from the API, e.g. in the instance of Microsoft™ Windows™ from the Windows™ API. Accordingly, as depicted Flow 700 comprises first to ninth steps 710 to 790 respectively, these comprising:

First step 710 wherein the Server 420 catches a request from an application to read folder content.

Second step 720 wherein the Server 420 sends to the Client Helper 415 a request for the folder metadata and provides a buffer.

Third step wherein the Client Helper 415 calls Windows™ API upon Device 410 to obtain folder metadata and provides the buffer with the size requested by the Server 420.

Fourth step 740 wherein the OS of Device 410 creates a snapshot of the current folder metadata.

Fifth step 750 wherein Device 410 OS (e.g. Windows™) replies with the buffer filled with the first portion of metadata from the snapshot and a flag that more data is available.

Sixth step 760 wherein Client Helper 415 replies to the Server 420 with the filled buffer and a flag that more data is available.

Seventh step 770 wherein Server 420 completes the applications request with the buffer and the flag.

Eighth step 780 wherein the application requests the next portion.

Ninth step 790 wherein the Device 410 OS, e.g. Windows™, fills the buffer with the next portion from the snapshot created on the first call. The Device 410 OS, e.g. Windows™ decides in which order to get metadata from the snapshot for each next portion.

Whilst Flow 700 has been described from the perspective of a Windows™ implementation it would be evident to one of skill in the art that other implementations for other operating systems may be implemented.

Within embodiments of the invention when a file management application, file browser or another application iterates the same folder items again by sending an IRP request, e.g. IRP_MN_QUERY_DIRECTORY, then the Driver 425A satisfies such requests by filling the buffer from the cache without communication with the Client Helper 415 over the network. Accordingly, latency of request completion is reduced and where large numbers of items are involved the request is completed in portions allowing the file management application, file browser or another application to render this portion and allow the user to select one or more items if appropriate whilst the remaining items are identified and metadata transferred.

Within embodiments of the invention in order to maintain the cache in the required, actual, state and to reject requests to open or create a desktop.ini file in the cached folder, the Driver 425A intercepts and handles a set of IRP requests to avoid this. Within Windows™ such IRP requests may include, but not be limited to, IRP_MJ_CREATE, IRP_MJ_CLOSE, IRP_MJ_WRITE, IRP_MJ_FILE_SYSTEM_CONTROL, IRP_MJ_CLEANUP and IRP_MJ_SET_INFORMATION.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:
1. A method comprising:
   providing a client side helper application (client helper) in execution upon an electronic device associated with a user;
   providing a server side driver application (driver) in execution upon a server in communication with the electronic device via a network;

providing a user mode proxy application (user mode proxy) in execution upon the server; and establishing a buffer storing metadata relating to a redirected drive folder path (path) relating to a folder accessible to an application in execution upon the electronic device; wherein the application in execution accesses the metadata stored within the buffer thereby reducing a latency of accessing data relating to the contents of the folder path; and the client helper, driver, and user mode proxy execute a process comprising:

opening from the electronic device a file manager application (file browser) upon the remote server;

establishing an identity of the path;

sending an input/output request protocol query (IRP) to a stack of the driver to get a list of folder items within the folder associated with the path;

establishing with the file browser a buffer to receive the list of folder items associated with the IRP;

intercepting the driver the IRP and holding it until a first portion of data is ready to reply with;

sending a request with the driver via the user mode proxy with the identity of the path requested to the client helper over the network;

receiving, with the client helper, the request and beginning to read metadata of the folder;

reading, with the client helper, folder items metadata calls and gets the first portion of items in the buffer;

sending, with the client helper, a reply over the network to the server incorporating the content of the buffer;

receiving the reply, with the user mode proxy, and passing it to the driver;

saving, with the driver, the folder items metadata in a cache; and filling, with the driver, the buffer provided by the IRP with folder items metadata from the cache.

2. The method according to claim 1, wherein opening from the electronic device a file manager employs file manager application programming interface within a remote desktop session; and the user can control the file manager locally upon the device.

3. The method according to claim 1, wherein receiving, with the client helper, the request leading to beginning to read metadata of the path further comprises monitoring for changes in the folder.

4. The method according to claim 1, further comprising determining whether a retrieved set of folder items metadata associated with a folder defined by the path stored within a buffer is complete or not;

upon determining the retrieved set of folder items metadata is not complete executing with the driver and client helper a process comprising the steps of:

iteratively sending, with the driver, requests to the client helper for another portion of the set of folder items metadata until a final portion of the set of folder items metadata has been received;

receiving, with the client helper, the sequential requests from the driver for the same folder defined by the path wherein the client helper make calls for the next portions of the set of folder items metadata and replies to the driver with the next portions of the of the set of folder items metadata; wherein the file browser receives a first portion of the set of folder items metadata, renders them upon a display associated with the device and issues requests displays them to user and requests the other portions of the set of folder items metadata.

5. The method according to claim 1, further comprising monitoring for changes in the folder; wherein the monitoring is performed by a process comprising the steps of:

employing an application programming interface (API) to subscribe to notifications relating to a folder associated with the monitored path, where the notifications relate to changes in the folder;

upon receiving a notification relating to the folder retrieving, with the API, information describing changes within the folder;

establishing in dependence upon the retrieved information a folder change description;

sending, with the client helper, the folder change description to the driver over the network;

receiving, with the driver, the folder change descriptions; and modifying, with the driver, the folder items metadata in cache according to the received folder change descriptions.

6. The method according to claim 1, further comprising monitoring for changes in the folder; wherein the monitoring is performed by a process comprising the steps of:

monitoring a plurality of read calls where each read call of the plurality of read calls retrieves information describing changes within the folder associated with the path;

establishing the retrieved information for each read call of the plurality of read calls as a folder change description;

sending, with the client helper, the folder change descriptions associated with the plurality of read calls to the driver over the network;

receiving, with the driver, the folder change descriptions; and modifying, with the driver, the folder items metadata in cache according to the received folder change descriptions.

7. A method comprising:

providing a client side helper application (client helper) in execution upon an electronic device associated with a user;

providing a server side driver application (driver) in execution upon a server in communication with the electronic device via a network;

providing a user mode proxy application (user mode proxy) in execution upon the server; and establishing a buffer storing metadata relating to a redirected drive folder path (path) relating to a folder accessible to an application in execution upon the electronic device determining whether a retrieved set of folder items metadata associated with a folder defined by the path stored within a buffer is complete or not;

upon determining the retrieved set of folder items metadata is not complete executing with the driver and client helper a process comprising the steps of:

iteratively sending, with the driver, requests to the client helper for another portion of the set of folder items metadata until a final portion of the set of folder items metadata has been received;

receiving, with the client helper, the sequential requests from the driver for the same folder defined by the path wherein the client helper make calls for the next portions of the set of folder items metadata and replies to the driver with the next portions of the of the set of folder items metadata; wherein the file browser receives a first portion of the set of folder items metadata, renders them upon a display associated with the device and issues requests displays them to user and requests the other portions of the set of folder items metadata; and the application in execution accesses the metadata stored within the buffer thereby reducing a latency of accessing data relating to the contents of the folder path.

8. A method comprising:

providing a client side helper application (client helper) in execution upon an electronic device associated with a user;

providing a server side driver application (driver) in execution upon a server in communication with the electronic device via a network;

providing a user mode proxy application (user mode proxy) in execution upon the server; and establishing a buffer storing metadata relating to a redirected drive folder path (path) relating to a folder accessible to an application in execution upon the electronic device; and monitoring for changes in the folder; wherein the monitoring is performed by a process comprising the steps of:

monitoring a plurality of read calls where each read call of the plurality of read calls retrieves information describing changes within the folder associated with the path;

establishing the retrieved information for each read call of the plurality of read calls as a folder change description;

sending, with the client helper, the folder change descriptions associated with the plurality of read calls to the driver over the network;

receiving, with the driver, the folder change descriptions; and modifying, with the driver, the folder items metadata in cache according to the received folder change descriptions; wherein the application in execution accesses the metadata stored within the buffer thereby reducing a latency of accessing data relating to the contents of the folder path.

\* \* \* \* \*